US012796888B2

(12) United States Patent
Digman et al.

(10) Patent No.: US 12,796,888 B2
(45) Date of Patent: Nov. 17, 2026

(54) DISHWASHER WITH WIRELESSLY POWERED IMAGING DEVICE AND COMMUNICATION

(71) Applicant: Midea Group Co., Ltd., Beijiao (CN)

(72) Inventors: Robert M. Digman, Goshen, KY (US); Alexi Blaise Poth, Louisville, KY (US)

(73) Assignee: MIDEA GROUP CO., LTD., Beijiao (CN)

(*) Notice: Subject to any disclaimer, the term of this patent is extended or adjusted under 35 U.S.C. 154(b) by 397 days.

(21) Appl. No.: 18/486,289

(22) Filed: Oct. 13, 2023

(65) Prior Publication Data

US 2025/0120563 A1 Apr. 17, 2025

(51) Int. Cl.

| | |
|---|---|
| ***A47L 15/00*** | (2006.01) |
| ***A47L 15/42*** | (2006.01) |
| ***A47L 15/46*** | (2006.01) |
| ***H02J 50/00*** | (2016.01) |
| ***H02J 50/80*** | (2016.01) |

(52) U.S. Cl.

CPC ......... *A47L 15/4293* (2013.01); *A47L 15/006* (2013.01); *A47L 15/4221* (2013.01); *A47L 15/4274* (2013.01); *A47L 15/4295* (2013.01); *A47L 15/46* (2013.01); *H02J 50/005* (2020.01); *H02J 50/80* (2016.02); *A47L 2401/30* (2013.01); *A47L 2501/20* (2013.01)

(58) Field of Classification Search

None

See application file for complete search history.

(56) References Cited

U.S. PATENT DOCUMENTS

| | | | |
|---|---|---|---|
| 10,018,402 | B2 | 7/2018 | Sumihiro |
| 10,674,569 | B2 | 6/2020 | Luckhardt |
| 10,809,685 | B2 | 10/2020 | Fawaz |
| 11,632,604 | B2 | 4/2023 | Park |
| 2020/0138261 | A1 | 5/2020 | Terrádez Alemany |
| 2020/0301382 | A1* | 9/2020 | Fawaz ................ G05B 19/0426 |
| 2022/0183531 | A1 | 6/2022 | Shin |
| 2022/0412645 | A1 | 12/2022 | Bihr |

FOREIGN PATENT DOCUMENTS

| | | | |
|---|---|---|---|
| CN | 107733097 | A | 2/2018 |
| CN | 207518357 | U | 6/2018 |
| CN | 109000416 | A | 12/2018 |
| CN | 113470122 | A | 10/2021 |
| CN | 109000424 | B | 5/2022 |
| EP | 4173542 | A1 | 5/2023 |

OTHER PUBLICATIONS

Hu, Peng Fei et al., A Multilayer Relay Wireless Power Transfer System with Coupled Magnetic Resonance for Coverage inside Electrical Appliances, ICCEM, 3 pages, dated 2018.

* cited by examiner

*Primary Examiner* — Levon J Shahinian

(74) *Attorney, Agent, or Firm* — Gray Ice Higdon

(57) ABSTRACT

A dishwasher may utilize wireless power to power an electric device disposed within a wash tub. Such a dishwasher can include: a wash tub including a rack; a spray device disposed in the wash tub; a fluid supply to supply wash fluid to the spray device during a wash cycle that washes a load; a wireless power transmitter external from the wash tub; a wireless power receiver supported by the rack and positioned adjacent to the wireless transmitter when the rack is in a washing position; and a wirelessly powered electrical device supported by the rack.

20 Claims, 5 Drawing Sheets

DISHWASHER WITH WIRELESSLY POWERED IMAGING DEVICE AND COMMUNICATION

BACKGROUND

Dishwashers are used in many single-family and multi-family residential applications to clean dishes, silverware, cutlery, cups, glasses, pots, pans, etc. (collectively referred to herein as "utensils"). Many dishwashers rely primarily on rotatable spray arms that are disposed at the bottom and/or top of a tub and/or are mounted to a rack that holds utensils. A spray arm is coupled to a source of wash fluid and includes multiple apertures for spraying wash fluid onto utensils, and generally rotates about a central hub such that each aperture follows a circular path throughout the rotation of the spray arm. The apertures may also be angled such that force of the wash fluid exiting the spray arm causes the spray arm to rotate about the central hub.

In some instances, dishwashers may further include one or more cameras or sensors within the wash tub to observe and collect data regarding the contents of the wash tub. This may allow for decisions regarding the wash cycle to be made. For example, if excess soiling on the dishes is detected, the wash cycle may be lengthened to ensure a complete cleanliness of the dishes. Conventionally, these cameras or sensors require the use of wiring, which in turn may limit the placement of these devices (e.g., these devices may be limited to the perimeter of the wash tub where wiring is easiest).

SUMMARY

The herein-described embodiments address these and other problems associated with the art by utilizing in a dishwasher a wireless power transmitter exterior to an internal surface of a wash tub of the dishwasher and a wireless power receiver internal to the dishwasher to wirelessly power a wirelessly powered device supported by a movable portion of the dishwasher, e.g., an imaging device capable of capturing image data and wirelessly transmitting the image data.

Therefore, consistent with one aspect of the invention, a dishwasher may include a wash tub including a rack, at least one spray device disposed in the wash tub and supported by the rack, a fluid supply configured to supply wash fluid to the at least one spray device during a wash cycle that washes a load, the fluid supply including at least one pump, a wireless power transmitter external from an internal surface of the wash tub, a wireless power receiver supported by the rack and positioned adjacent to the wireless transmitter when the rack is in a washing position, and a wirelessly powered electrical device supported by the rack and electrically coupled to the wireless power receiver to receive power communicated from the wireless power transmitter to the wireless power receiver.

In some embodiments, the wirelessly powered electrical device is an imaging device configured to capture one or more images within the wash tub. Also, in some embodiments, the rack is an upper rack and the imaging device is supported by the upper rack. Further, in some embodiments, the rack is a lower rack or a third rack and the imaging device is supported by the lower rack or third rack.

Some embodiments may further include a controller coupled to the imaging device and configured to control a wash cycle based on the one or more images captured by the imaging device. In some embodiments, the wirelessly powered electrical device is configured to wirelessly communicate data to the controller. In addition, in some embodiments, the at least one spray device is a spray arm and the wireless powered electrical device is a motor configured to drive the spray arm. In some embodiments, the wireless powered electrical device is a sensor configured to detect one or more properties within the wash tub. In addition, in some embodiments, the wirelessly powered electrical device further includes a battery.

Consistent with another aspect of the invention, a dishwasher may include a wash tub, at least one spray device disposed in the wash tub, a fluid supply configured to supply wash fluid to the at least one spray device during a wash cycle that washes a load, the fluid supply including at least one pump, a wireless power transmitter external from an internal surface of the wash tub, a wirelessly powered electrical device disposed within the wash tub, and a fluid conduit configured to support the at least one spray device and the wirelessly powered electrical device. The fluid conduit includes a docking port configured to receive fluid from the fluid supply and convey the fluid to the at least one spray device, and a wireless power receiver positioned to receive power from the wireless power transmitter.

Moreover, in some embodiments, the wirelessly powered electrical device is an imaging device configured to capture one or more images within the wash tub. Some embodiments may also include a rack, the fluid conduit includes a manifold and is supported by the rack, and the imaging device is disposed on the manifold. In addition, some embodiments further include an occlusion prevention device, and the occlusion prevention device interfaces with the at least one spray device and prevents the at least one spray device from occluding the imaging device when the at least one spray device is in a resting position.

Some embodiments may further include a controller coupled to the imaging device and configured to control a wash cycle based on the one or more images captured by the imaging device. In some embodiments, wirelessly powered electrical device is configured to wirelessly communicate data to the controller. In addition, in some embodiments, the wirelessly powered electrical device further includes a battery.

Consistent with another aspect of the invention, a dishwasher may include a wash tub, a rotatable spray device disposed in the wash tub, one or more imaging devices disposed proximate to the rotatable spray device, and an occlusion prevention device configured to prevent the rotatable spray device from stopping at a location that occludes the imaging device.

In some embodiments, the rotatable spray device is supported by a support member, and the occlusion prevention device includes a depressible element disposed on one of the rotatable spray device and the support member, the depressible element biased to an extended position and positioned to contact a structure on the other of the rotatable spray device and the support member during rotation of the rotatable spray device. Moreover, in some embodiments, the support member is a fluid conduit and the depressible element is biased to the extended position by a spring and is disposed on the fluid conduit. Also, in some embodiments, the rotatable spray device is supported by a support member, and the occlusion prevention device includes a first magnet disposed on the rotatable spray device, and a second magnet disposed on the support member proximate a path of the first magnet during rotation of the rotatable spray device and configured to repel the first magnet when the first and second magnets are proximate to one another.

Other embodiments may include various methods for making and/or using any of the aforementioned constructions.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description and is not intended to identify key or essential features of the claimed subject matter, nor is it intended to be used as an aid in limiting the scope of the claimed subject matter.

BRIEF DESCRIPTION OF THE DRAWINGS

FIG. 3A illustrates the dishwasher with an upper rack in a washing or an operating position; FIG. 3B illustrates the dishwasher with the upper rack in the loading position.

FIG. 6A illustrates a first embodiment of an occlusion prevention device;

FIG. 6B illustrates another embodiment of an occlusion prevention device.

DETAILED DESCRIPTION

In the embodiments discussed below, a dishwasher may include one or more imaging devices or other wireless devices capable of wireless communication, and wirelessly powered from a wireless transmitter located externally from a wash tub of the dishwasher. In addition, in some embodiments, the data collected from these wireless devices may be used to alter one or more parameters of the wash cycle. Furthermore, one or more occlusion prevention devices may be used to prevent occlusion of an imaging device within the wash tub.

Figure 1:
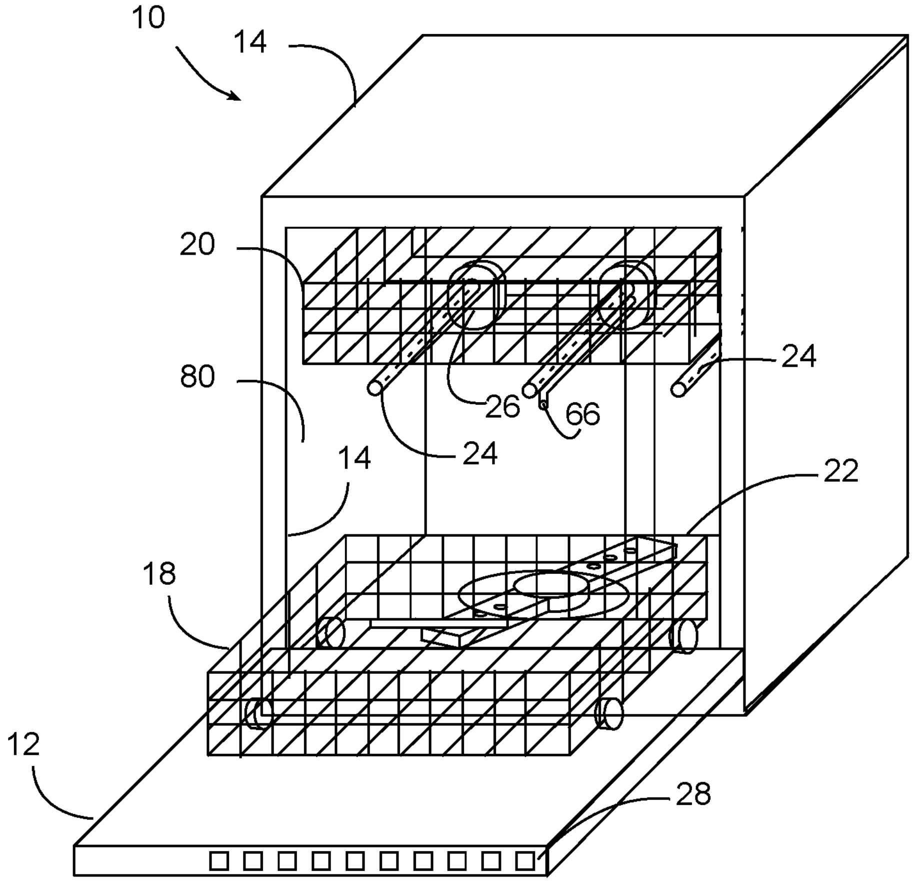
FIG. 1 is a perspective view of a dishwasher consistent with some embodiments of the invention.

Turning now to the drawings, wherein like numbers denote like parts throughout the several views, FIG. 1 illustrates an example dishwasher 10 in which the various technologies and techniques described herein may be implemented. Dishwasher 10 is a residential-type built-in dishwasher, and as such includes a front-mounted door 12 that provides access to a wash tub 14 housed within a cabinet or housing 16. Door 12 is generally hinged along a bottom edge and is pivotable between the opened position illustrated in FIG. 1 and a closed position (not shown). When door 12 is in the opened position, access is provided to one or more sliding racks, e.g., lower rack 18 and upper rack 20, within which various utensils are placed for washing. Lower rack 18 may be supported on rollers, while upper rack 20 may be supported on side rails, and each rack is movable between loading (extended) and washing (retracted) positions along a substantially horizontal direction. One or more spray devices, e.g., a lower spray arm 22 and a plurality of tubular spray elements (TSEs) 24, may be provided to direct a spray of wash fluid onto the contents in the wash tub. In addition, in some embodiments one or more spray devices (e.g., tubular spray elements 24) may be controllably-movable, e.g., using a tubular spray element drive 26, such that the direction of spray can be controlled. In some embodiments, all spray devices may be controllably-movable, while in other embodiments, no spray devices may be controllably-movable. While tubular spray elements are illustrated in FIG. 1, it will be appreciated that the principles of the invention may be utilized in dishwashers utilizing only spray arms as spray devices.

Control over dishwasher 10 by a user is generally managed through a control panel 28 typically disposed on a top or front of door 12, and it will be appreciated that in different dishwasher designs, the control panel may include various types of input and/or output devices, including various knobs, buttons, lights, switches, textual and/or graphical displays, touch screens, etc. through which a user may configure one or more settings and start and stop a wash cycle. Additionally or alternatively, a user may configure settings, start and stop a wash cycle, view and/or interact with images captured within a wash tub, etc., via a remote device or service (e.g., an app or web service accessed through a mobile device).

The embodiments discussed hereinafter will focus on the implementation of the hereinafter-described techniques within a hinged-door dishwasher. However, it will be appreciated that the herein-described techniques may also be used in connection with other types of dishwashers in some embodiments. For example, the herein-described techniques may be used in commercial applications in some embodiments. Moreover, at least some of the herein-described techniques may be used in connection with other dishwasher configurations, including dishwashers utilizing sliding drawers. In addition, the herein-described techniques may also be used in connection with dishwashers incorporating three or more racks, e.g., dishwashers including a shallow third rack at the top of the wash tub for silverware, cups or other smaller objects, in addition to the traditional upper and lower racks.

Figure 2:
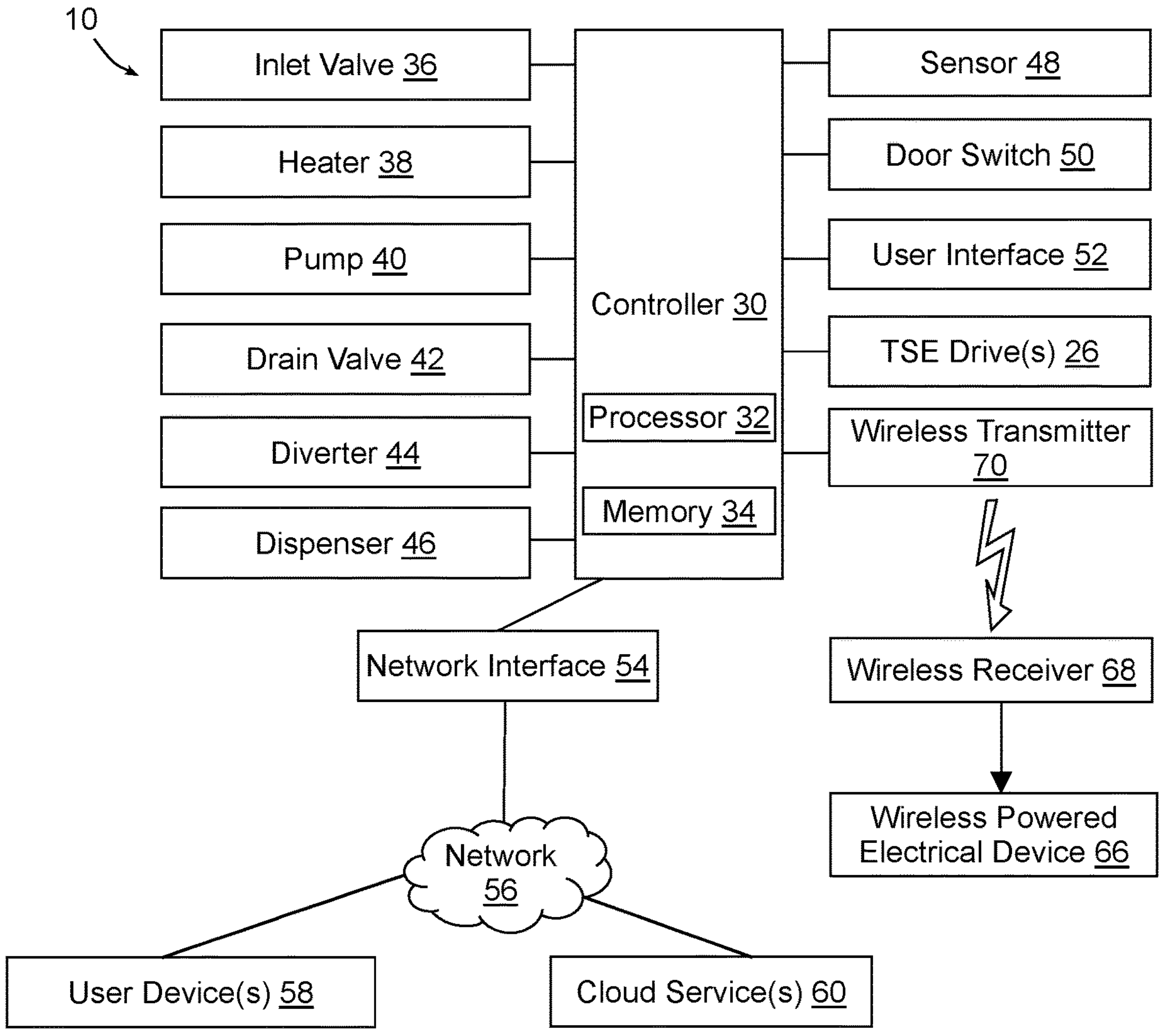
FIG. 2 is a block diagram of an example control system for the dishwasher of FIG. 1.

Now turning to FIG. 2, dishwasher 10 may be under the control of a controller 30 that receives inputs from a number of components and drives a number of components in response thereto. Controller 30 may, for example, include one or more processors 32 and a memory 34 within which may be stored program code for execution by the one or more processors. The memory may be embedded in controller 30, but may also be considered to include volatile and/or non-volatile memories, cache memories, flash memories, programmable read-only memories, read-only memories, etc., as well as memory storage physically located elsewhere from controller 30, e.g., in a mass storage device or on a remote computer interfaced with controller 30.

As shown in FIG. 2, controller 30 may be interfaced with various components, including one or more tubular spray element drives 26 and/or the drive systems of other controllably-movable sprayers, as well as an inlet valve 36 that is coupled to a water source to introduce water into wash tub 14, which when combined with detergent, rinse agent and/or other additives, forms various wash fluids. A wash fluid may be considered to be a fluid, generally a liquid, incorporating at least water, and in some instances, additional components such as detergent, rinse aid, and other additives. During a rinse operation, for example, the wash fluid may include only water. A wash fluid may also include steam in some instances.

Controller 30 may also be coupled to a water heater 38 that heats fluids, a pump 40 that recirculates fluid within the wash tub by pumping fluid to the wash arms and other spray devices in the dishwasher, a drain valve 42 that is coupled to a drain to direct fluids out of the dishwasher, and a diverter 44 that controls the routing of pumped fluid to different wash arms and/or other spray devices during a wash cycle. In some embodiments, a single pump 40 may be used, and drain valve 42 may be configured to direct pumped fluid either to a drain or to the diverter 44 such that pump 40 is used both to drain fluid from the dishwasher and to recirculate fluid throughout the dishwasher during a wash cycle. In other embodiments, separate pumps may be used for draining the dishwasher and recirculating fluid. Diverter 44 in some embodiments may be a passive diverter that automatically sequences between different outlets, while in some embodiments diverter 44 may be a powered diverter that is controllable to route fluid to specific outlets on demand. Generally, pump 40 may be considered to be a fluid supply in some embodiments as pump 40 supplies a pressurized source of fluid to diverter 44 for distribution to one or more spray arms and/or spray devices.

Controller 30 may also be coupled to a dispenser 46 to trigger the dispensing of detergent and/or rinse agent into the wash tub at appropriate points during a wash cycle. Additional sensors 48 and actuators may also be used in some embodiments, including, for example, a temperature sensor to determine a wash fluid temperature, a door switch 50 to determine when door 12 is latched, various turbidity or conductivity sensors, etc. Moreover, controller 30 may be coupled to a user interface 52 including various input/output devices such as knobs, dials, sliders, switches, buttons, lights, textual and/or graphics displays, touch screen displays, speakers, image capture devices, microphones, etc. for receiving input from and communicating with a user (e.g., at least partially disposed on control panel 28 of FIG. 1).

In some embodiments, controller 30 may also be coupled to one or more network interfaces 54, e.g., for interfacing with external devices via wired and/or wireless networks 56 such as Ethernet, Wi-Fi, Bluetooth, NFC, Thread, Zigbee, Z-Wave, RFID and other suitable networks. For example, dishwasher 10 may interface with one or more user devices 58, e.g., to permit consumer remote control of dishwasher 10 and/or to provide status information to a consumer. Dishwasher 10 may also interface with one or more remote services 60, e.g., for diagnostics, maintenance, system updates, remote control, and/or practically any other suitable purpose. Additional components may also be interfaced with controller 30, as will be appreciated by those of ordinary skill having the benefit of the instant disclosure.

As shown in FIG. 2, controller 30 may also be coupled to a wireless power transmitter 70, for example disposed exterior to an internal surface of the wash tub of the dishwasher 10 (e.g., internal surface 80 of wash tub 14 as illustrated in FIG. 1). Power may flow from the line power (e.g., 120-240 VAC, as may be provided by a residential electrical circuit) to a power supply (e.g., an AC-DC power supply), which is not illustrated, and then to the wireless transmitter 70. Controller 30 may control wireless power transmitter 70 to selectively activate/deactivate the wireless power transmitter 70, to regulate the power output of the wireless power transmitter 70. The wireless power transmitter 70 may wirelessly transmit power to a wireless power receiver 68 (for example, contained within the wash tub of the dishwasher), which supplies power to one or more wirelessly powered electrical devices 66. In addition to providing power, the wireless power transmitter 70 and the wireless power receiver 68 may also be used to communicate data to and/or receive data from wirelessly powered electric device 66, etc. In some additional or alternative embodiments, wireless communication may be through a separate wireless interface such as Bluetooth, etc. In the illustrated embodiment, wireless power transmitter 70 is compatible with the Ki Kitchen Cordless Standard developed by the Wireless Power Consortium, although other wireless power or charging standards may be used in other embodiments, including, for example, the Qi Wireless Charging Standard also developed by the Wireless Power Consortium. It will be appreciated that the control over wireless power transmitter 70 by controller 30 to emit a wireless power signal would be well within the abilities of those of ordinary skill having the benefit of the instant disclosure.

Moreover, in some embodiments, at least a portion of controller 30 may be implemented externally from dishwasher 10, e.g., within a mobile device, a cloud computing environment, etc., such that at least a portion of the functionality described herein is implemented within the portion of the controller that is externally implemented. In some embodiments, controller 30 may operate under the control of an operating system and may execute or otherwise rely upon various computer software applications, components, programs, objects, modules, data structures, etc. In addition, controller 30 may also incorporate hardware logic to implement some or all of the functionality disclosed herein. Further, in some embodiments, the sequences of operations performed by controller 30 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Numerous variations and modifications to the dishwasher illustrated in FIGS. 1-2 will be apparent to one of ordinary skill in the art, as will become apparent from the description below. Therefore, the invention is not limited to the specific implementations discussed herein.

Wirelessly Powered Devices and Communication

In some embodiments of the invention, it may be desirable to utilize a wireless imaging device or system to evaluate the contents of a dishwasher prior to and/or during a wash cycle for the purposes of optimizing performance of the dishwasher. The imaging system in some embodiments may include one or more cameras or other imaging devices disposed within the dishwasher and capable of sensing one or more objects within the dishwasher. Traditionally, any cameras or imaging devices utilized within kitchen appliances have required wiring to the camera from a power source, which has impacted the placement of the devices. The imaging devices described herein are wirelessly powered, and accordingly, do not require a wired power source, meaning that such imaging devices can be more easily located on a movable component such as a rack. Furthermore, wired contacts or connectors are subject to the harsh environmental conditions in the wash tub; wireless power, such as described herein, would not require metal contacts that would be exposed to moisture and detergent and would potentially corrode over time.

Figure 3A:
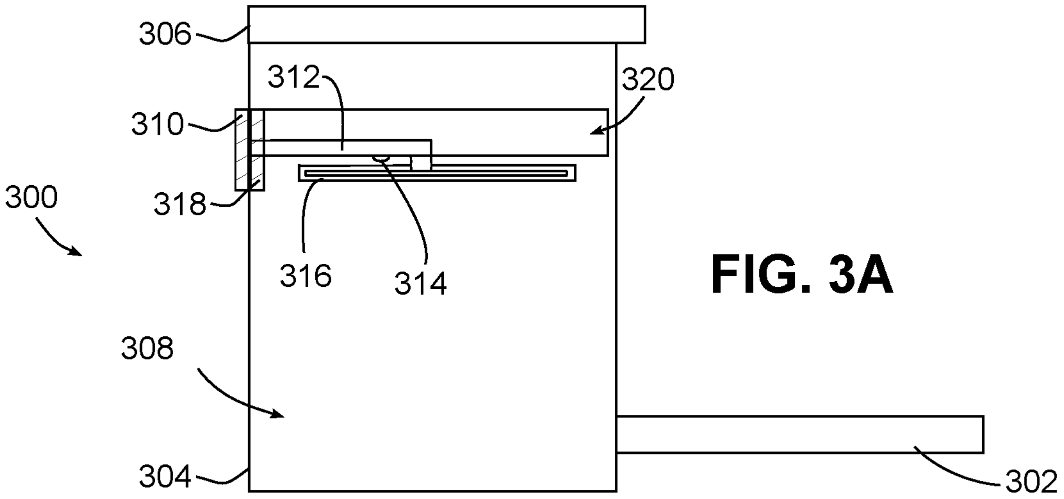
FIGS. 3A-B are schematics of a dishwasher consistent with some embodiments of the invention.
Figure 3B:
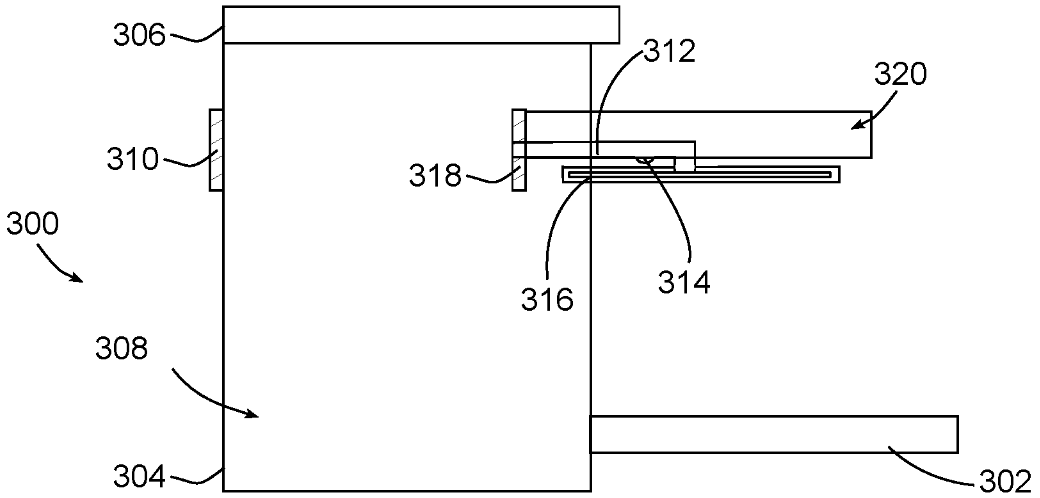

Now turning to FIGS. 3A-B, various views are provided of an example dishwasher 300 in which the various technologies and techniques described herein may be implemented. FIG. 3A illustrates a side view of the example dishwasher with an upper rack 320 in a washing or an operating position; and FIG. 3B illustrates a side view of the example dishwasher with the rack in a loading position. The dishwasher 300 illustrated in FIGS. 3A-B generally includes a door 302 joined to a cabinet 304 and positioned under a countertop 306. Inside the dishwasher is a wash tub 308 containing additional components of the dishwasher. Although, some portions of the dishwasher and surrounding environment are called out herein, they are not intended to be limiting. Furthermore, although only an upper rack 320 is illustrated, this is not intended to be limiting. As illustrated in FIG. 1, the dishwasher may include multiple racks, including an upper rack, lower rack, and in some embodiments, additional racks specifically designed for holding silverware or other utensils that may be disposed elsewhere within the wash tub.

A wireless power transmitter 310 is affixed onto or disposed external to an internal surface of the wash tub 308, such that the wireless power transmitter is desirably not exposed to the various environmental conditions that occur within the wash tub during a wash cycle (e.g., heat, moisture, detergent, etc.). The wireless power transmitter 310 is configured to wirelessly transmit power to a wirelessly powered electric device 314, and in some embodiments, is also configured to wirelessly transmit data to or receive data from wirelessly powered electric device 314. In the illustrated embodiment, the wirelessly powered electronic device 314 is an imagining device, such as a camera, disposed on the rack 320 or, alternatively on a manifold 312 supplying fluid to a spray arm 316, which will be discussed in detail herein. However, this is not intended to be limiting, as the wirelessly powered electric device could, in some embodiments, be a motor configured to drive a spray arm (see e.g., FIG. 7) or a tubular spray element. In some additional, or alternative, embodiments the wirelessly powered electric device may be a sensor (e.g., a turbidity sensor, temperature sensor, etc.) configured to detect one or more properties within the wash tub.

The wireless power transmitter 310 may be controlled by controller 30 (described above with reference to FIG. 2), or alternatively may be controlled by a separate controller. The wireless power transmitter 310 emits a wireless power signal that is received by a wireless power receiver 318, which in turn powers the a wirelessly powered electrical device 314 (e.g., imaging device). When positioned proximate wireless power transmitter 310, wireless power receiver 318 receives a wireless power signal to supply power to the wirelessly powered electrical device 314. In some embodiments, the transmitted and received power may additionally be stored by a battery (see e.g., FIG. 4) to allow for use when the wirelessly powered electrical device is not proximate to the wireless power transmitter 310 (e.g., when the rack is in a loading position). In addition, one or more wires may be used to communicate power between wireless power receiver 318 and wirelessly powered electrical device 314. The wires may, in some embodiments, be integrated into the construction of the rack or manifold 312 and/or spray arm 316. Other manners of electrically connecting wireless power receiver 318 and wirelessly powered electrical device 314 may be used in other embodiments, e.g., separate wires, deposited or comolded conductive traces, etc.

In the embodiment of FIG. 3A-B, the wirelessly powered electrical device 314 is an imaging device disposed on the rack 320 or manifold 312 for supplying water to a rack-mounted spray arm 316. As illustrated and discussed with respect to FIGS. 3A-B, the manifold 312 may be dockable, that is removable from a docking arrangement. As illustrated, the spray arm 316 mounted on the rack 320 is generally hollow or at least includes one or more internal fluid passages that are in fluid communication with one or more spray nozzles for distributing water throughout the wash tub.

Due to the wireless nature of the imaging device 314 and optional battery component (see FIG. 4) image data may be captured when the rack 320 is in the washing or operational position illustrated in FIG. 3A and when the rack 320 is in a loading position, as illustrated in FIG. 3B.

The imaging device of FIGS. 3A-B may be used to capture image data regarding the contents of the wash tub 308. The imaging device may operate in the visible spectrum (e.g., RGB cameras) in some embodiments, or may operate in other spectra, e.g., the infrared spectrum (e.g., IR cameras), the ultraviolet spectrum, etc. Moreover, the imaging device may collect two dimensional and/or three-dimensional image data in different embodiments, may use range or distance sensing (e.g., using LIDAR and/or RADAR), and may generate static images and/or video clips in various embodiments. The imaging device may provide image data to the controller (e.g., controller 30 of FIG. 2) regarding the type and amount of content in the wash tub, the soil level and/or type of the contents of the tub, etc. Based on these images and/or data, the controller (e.g., controller 30) may alter one or more aspects of the wash cycle. For example, where excess soil or debris is detected the wash cycle may be lengthened. Additionally, in some embodiments, the controller may use the image(s) and/or data may be used as input into a machine learning model or other artificial intelligence program in order to optimize the wash cycle base on the contents, soil level, etc. of an individualized load of the dishwasher. Although the imaging device is generally facing downward in the embodiment illustrated in FIG. 3A-B, this is not intended to be limiting. In some embodiments, the imaging device may be oriented facing upward, outward, or any other desirable orientation. Furthermore, the imaging device 314 may, in some embodiments, be incorporated within a module that is waterproof and sealed (see e.g., FIG. 4). A battery, if present, may also be disposed within this module. The imaging device 314 may also be movable separate from the manifold 312 in some embodiments, e.g., using a separate motor powered by the power received by wireless power receiver 318.

It should be appreciated, however, that by virtue of its placement near the center of the wash tub, and directly over any lower rack, imaging device 314 provides a desirable viewpoint from which to capture images of the utensils in the lower rack. Thus, by utilizing wireless power implemented through a rack supported structure such as a manifold, the imaging device is able to be positioned at a desirable viewpoint yet still be powered without requiring a wired connection or a storage element such as a battery as would otherwise be required when the imaging device is supported on a movable component such as a rack.

Figure 4:
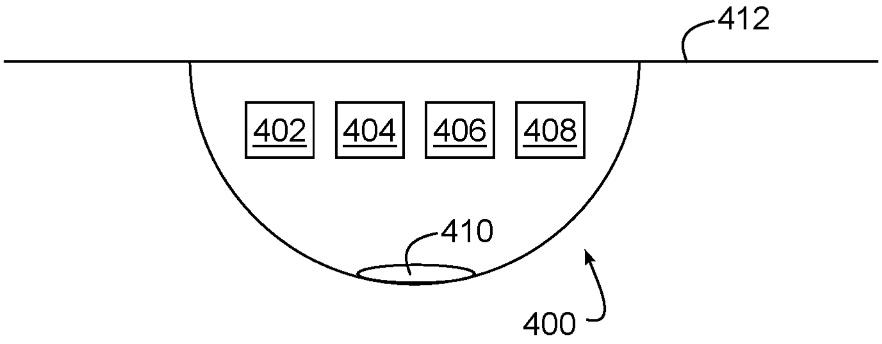
FIG. 4 is a schematic of an imaging device module consistent with some embodiments of the invention.

FIG. 4 illustrates an exemplary module 400 containing an imaging device 410, which may be similar, for example, to wirelessly powered device 314 of FIGS. 3A-B. The module 400 may be mounted on a rack 412 (as illustrated), manifold, or a spray arm, or other movable component of the dishwasher, and may receive power from a wireless power receiver such as wireless power receiver 318 of FIGS. 3A-B. The imaging device module 400, as described above, may be sealed and waterproof in order to protect the internal components from the water, detergent, etc. in the dishwasher. In the illustrated embodiment, the module 400 additionally contains a processor 402, as well as an over-the-air signal transmitter 404, and an over-the-air signal receiver 406 in order to allow for wireless data transmission and receipt. This allows, for example, image data to be sent to a controller (e.g., controller 30 of FIG. 2) so that the one or more properties of the wash cycle may in altered in response to the image data. Although illustrated as separate components in FIG. 4, the over-the-air signal transmitter 404 and receiver 406 may not necessarily be separate, and in some embodiments may be combined as a single transmitter and receiver. Examples of wireless data communication that may be implemented in such embodiments include, but are not limited to, Wi-Fi, Bluetooth, NFC, Thread, Zigbee, Z-Wave, RFID, cellular and other suitable network(s). If present, the imaging device module 400 may also include a battery 408 to store power wirelessly received.

Figure 5:
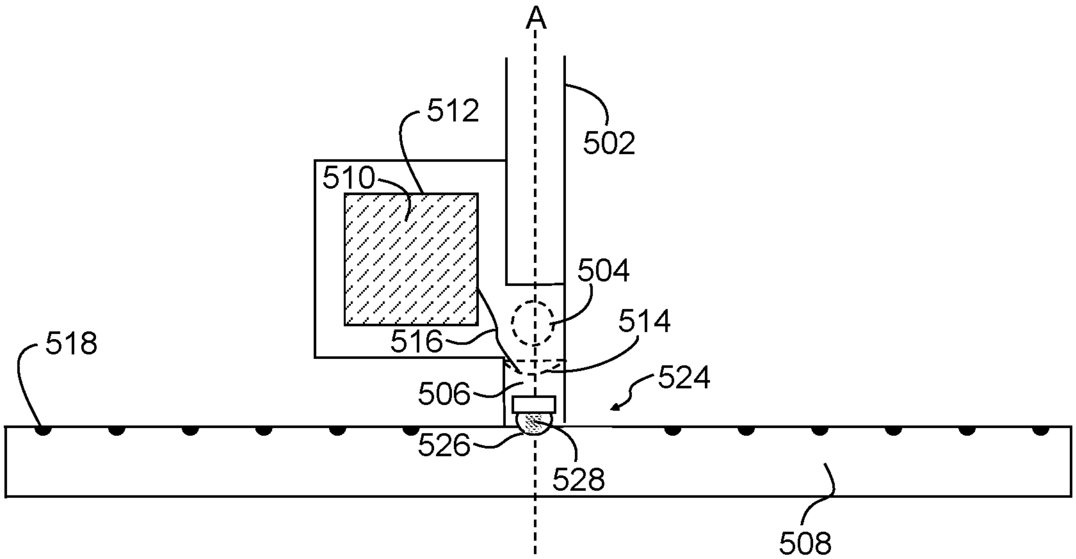
FIG. 5 is a schematic of a portion of a dishwasher consistent with some embodiments of the invention.

FIG. 5 illustrates a partial front view of the interior of a wash tub of a dishwasher in another embodiment in which wireless power may be used. In the embodiment of FIG. 5, a tub supply conduit 502 may, for example, run along a back wall of the wash tub. The tub supply conduit 502 may meet with rack-supported water dock 504 (illustrated in broken line) in order to supply water to the various spray devices in the wash tub, and specifically to a rack-supported manifold 506 and spray arm 508. Spray arm 508 may rotate about axis A in order to distribute water throughout the wash tub.

Also illustrated in FIG. 5 are a wireless power transmitter 510 (illustrated in broken line) that emits a wireless power signal that is received by a wireless power receiver 512, which in turn powers a wirelessly powered electrical device 514 (illustrated in broken line), such as an imaging device. The wireless power receiver 512 is integrated into the dishwasher assembly, specifically it may be integrated with the water dock 504 and/or manifold 506 so that when the rack is in a wash or operational position, the wireless power receiver 512 is positioned proximate to the wireless power transmitter 510; the wireless power receiver 512 receives a wireless power signal to supply power to the imaging device 514. In the illustrated embodiment, power is supplied to the imaging device 514 through one or more wires 516 extending from the wireless power receiver 512 to the imaging device. Furthermore, when in this wash or use position, wash fluid is supplied through the water dock 504 and manifold 506 to spray arm 508. In some embodiments, this power may additionally be stored by a battery (see 408 in FIG. 4) so that the wirelessly powered device (e.g., imaging device) may continue to capture and transmit data even when the wireless power receiver 512 is not proximate the wireless power transmitter 510. In some implementations, the wireless power receiver 512 may communicate data with the wireless power transmitter 510. In some additional or alternative embodiments, wireless communication may be through a separate wireless interface such as, for example, through one or more wireless communication protocols (described above) to provide information regarding image data collected from the imaging device.

Thus, it will be appreciated that manifold 506 may be considered to operate as a fluid conduit that integrates both a dock 504 that conveys fluid from a fluid supply (via tub supply conduit 502) to a spray arm 508 supported by the manifold (as well as by rack supporting manifold 506) and a wireless power receiver 512 that supplies electrical power to a wirelessly powered device. In some embodiments, for example, manifold 506 may be molded or otherwise formed as a unitary body capable of conveying both wash fluid/water and electrical power (as well as supporting each of a wireless power receiver, a wirelessly powered device, and a spray device), thereby simplifying the design of the rack-mounted components in the dishwasher.

As previously described, spray arm 508 rotates about axis A to further distribute water throughout the wash tub. The spray arm 508 may rotate in response to the reactive force from water being distributed via nozzles 518; accordingly, the spray arm 508 is generally free spinning. However, it would be undesirable for the spray arm 508 to rest or cease rotation in a location that would obstruct or occlude the view of the imaging device 514. In order to prevent such an obstruction, an occlusion prevention device 524 may be used in some embodiments to stop rotation of the spray arm 508 in a location that would not result in the obstruction of the view of the imaging device 514. An exemplary occlusion prevention device 524 is illustrated in greater detail in FIG. 6. Furthermore, although the occlusion prevention device illustrated in FIG. 5 is utilized along with wireless power, this is not intended to be limiting. The use of an occlusion prevention device may be independent of whether wireless power is used in a dishwasher, as illustrated in FIGS. 6A-B.

Figure 6A:
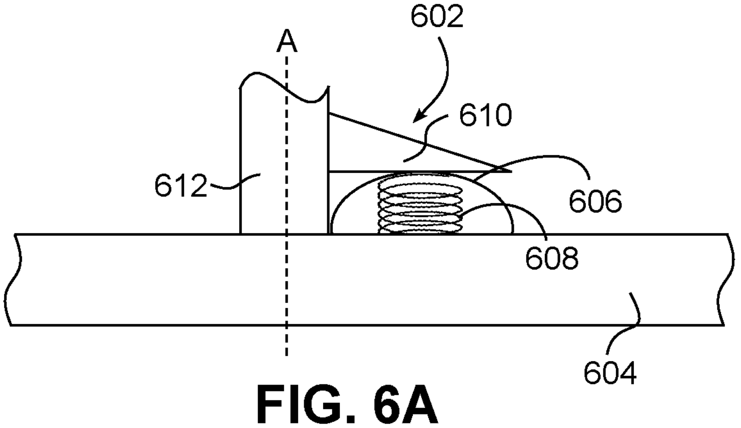
FIGS. 6A-B is an enlarged view of a portion of a spray arm of a dishwasher with an occlusion prevention device consistent with some embodiments of the invention.
Figure 6B:
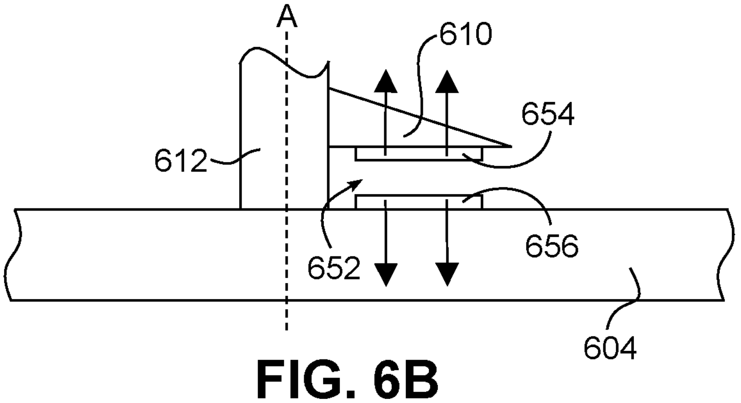

FIGS. 6A-B illustrate exemplary occlusion prevention devices 602, 652 for preventing a spray arm 604 from stopping its rotation in a particular location. As described above, this may be desirable when there is an imaging device contained within the wash tub, although this is certainly not limiting, as there may be other rationales for stopping the spray arm 604 in a particular location. In the embodiment illustrated in FIG. 6A, the occlusion prevention device 602 includes a depressible element 606 containing a spring 608 that biases the depressible element to an extended position. As such, when the depressible element is in the extended position, the depressible element is positioned to contact a protrusion 610 extending from the manifold 612 that interfaces with the spray arm 604 and functions as a support member that rotatably supports the spray arm. In this embodiment, the spray arm 604, when in motion due to the force of the water being driven through it, can overcome the bias of spring 608 and cause depressible element 606 to depress when contacting protrusion 610 and continue to rotate. However, when the force of the water driving the rotation is removed, the spray arm 604 is unable to overcome the bias of spring 608 of the occlusion prevention device 602, such that when depressible element 606 contacts protrusion 610, the spray arm 604 will bounce back rather than rotate to a position where it occludes imaging device 606. As such, occlusion prevention device 602 effectively prevents the spray arm 604 from coming to stop in a resting position in which the spray arm occludes any portion of the field of view of the imaging device.

It will be appreciated that the width of protrusion 610 may be designed (or alternatively, multiple protrusions may be used) to prevent the spray arm from stopping in any location where the spray arm can occlude the imaging device. Multiple depressible elements and/or protrusions may also be provided in some embodiments to prevent any blade of the spray arm from occluding the imaging device. Furthermore, while depressible element 606 is illustrated as being disposed on spray arm 604 and protrusion 610 is illustrated as being disposed on manifold 612, these components may be reversed in other embodiments. Furthermore, a depressible element or protrusion may be disposed on other types of support members that rotatably support spray arm 604. A depressible element or protrusion in some embodiments may be supported by other structures in the wash tub in some embodiments, so long as one of a depressible element and a protrusion rotates with the spray arm and the other of a depressible element and a protrusion is stationary. As such, a depressible button or protrusion may be supported, for example, by a rack, by a wall of the wash tub, by a fluid supply conduit on the wall of the wash tub, by hub that rotates with the spray arm, or on other structures that will be appreciated by those of ordinary skill having the benefit of the instant disclosure.

In addition, while depressible element 606 is configured as a button-like shell having a separate spring 608 in FIG. 6A, in other embodiments, depressible element 606 may be configured itself as a deformable or elastic member capable of being moved or bent as a result of contact with a protrusion with sufficient force, but otherwise capable of halting the rotation of a spray arm in response to contact with the protrusion with a lower force. Depressible element 606 may also be configured to pivot and/or pivot (e.g., via a hinge) with respect to its supporting structure. Moreover, a protrusion 610 in some embodiments need not be designed solely for use in occlusion prevention, and may instead be a functional component of a dishwasher that is positioned to contact one or more depressible elements during rotation of a spray arm.

In the embodiment illustrated in FIG. 6B, the occlusion prevention device 652 for preventing a spray arm 604 from stopping its rotation in a particular location is a combination of magnets 654, 656. Like the embodiment of FIG. 6A, the occlusion prevention device 602 includes a protrusion 610 extending from the manifold 612 that interfaces with the spray arm 604. Disposed on, or incorporated into, the protrusion 610 is a first magnet 654. A second magnet 656 is disposed on, or incorporated into, the spray arm 604. The first magnet 654 and second magnet 656 are disposed in such a way as to repel from each other (e.g., like poles of first and second magnets are facing each other (e.g., north to north or south to south)). In this embodiment, the spray arm 604, when in motion due to the force of the water being driven through it, can overcome the repelling force of the magnets 654, 656 and continue to rotate. However, when the force of the water driving the rotation is removed, the spray arm 604 is unable to overcome the repelling of the magnets 654, 656 of the occlusion prevention device 652.

Returning to FIG. 5, in another embodiment, the spray arm itself may function as a protrusion in some embodiments. In this embodiment, a depressible element 526 is supported on manifold 506 and biased by a spring 528 to a downwardly-facing extended position (as illustrated in FIG. 5) that is in the path of spray arm 508. In this configuration, rotation of spray arm 508 causes the spray arm to contact depressible element 526 during its rotation and push the depressible element up as each blade of the spray arm hits the depressible element. When unpowered by the flow of wash fluid, however, the spray arm is incapable of rotating with sufficient force to overcome the bias of spring 528, such that any blade that hits the depressible element will bounce back once the momentum of the spray arm has sufficiently diminished, thereby preventing the spray arm from stopping in a location that occludes the imaging device.

Other types of devices to prevent the spray arm from stopping in a particular location may be used. For example, in some embodiments, attractive magnets may be used to encourage a spray arm to always stop in the same rotational position that does not occlude the imaging device. In addition, in some embodiments, where a spray arm is controllably rotated via a controllable motor or hydraulic drive, one or more position sensors (e.g., implemented as microswitches, hall effect switches, or encoders, among others) may be used to sense when a spray arm requires rotation to prevent occlusion.

Figure 7:
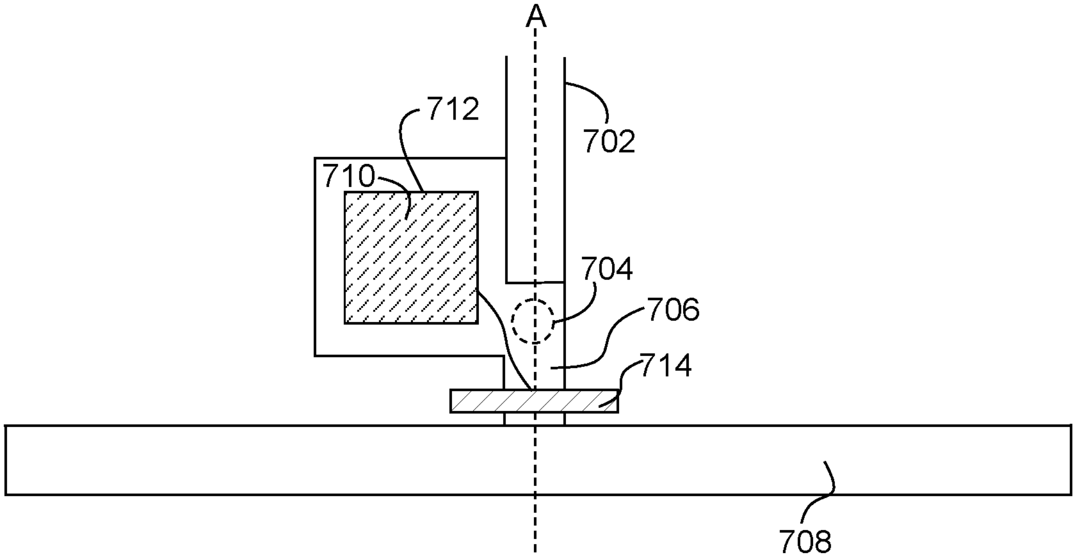
FIG. 7 is another schematic of a portion of a dishwasher consistent with some embodiments of the invention.

FIG. 7, similar to FIG. 5, illustrates a partial front view of the interior of a wash tub of a dishwasher in yet another embodiment in which wireless power may be used. In the embodiment of FIG. 7, a tub supply conduit 702 may, for example, run along a back wall of the wash tub. The tub supply conduit 702 may meet with water dock 704 in order to supply water to the wash tub, and specifically to the manifold 706 and spray arm 708. Spray arm 708 may rotate about axis A in order to distribute water throughout the wash tub. A wireless power transmitter 710 (illustrated in broken line) emits a wireless power signal received by a wireless power receiver 712, which in turn powers a wirelessly powered electrical device 714. In this embodiment, however, rather than being an imaging device, the wirelessly powered electrical device 714 is an electric motor that may facilitate driving the spray arm 708.

Although described and illustrated herein as a motor 714 for a spray arm 708, this is not intended to be limiting. The wireless power transmitter/receiver described here may also be used to power a motor for a tubular spray element or other component of a dishwasher.

It will also be appreciated that, while certain features may be discussed herein in connection with certain embodiments and/or in connection with certain figures, unless expressly stated to the contrary, such features generally may be incorporated into any of the embodiments discussed and illustrated herein. Moreover, features that are disclosed as being combined in some embodiments may generally be implemented separately in other embodiments, and features that are disclosed as being implemented separately in some embodiments may be combined in other embodiments, so the fact that a particular feature is discussed in the context of one embodiment but not another should not be construed as an admission that those two embodiments are mutually exclusive of one another. Various additional modifications may be made to the illustrated embodiments consistent with the invention. Therefore, the invention lies in the claims hereinafter appended.

What is claimed is:

1. A dishwasher, comprising:

a wash tub including a rack;

at least one spray device disposed in the wash tub and supported by the rack;

a fluid supply configured to supply wash fluid to the at least one spray device during a wash cycle that washes a load, the fluid supply including at least one pump;

a wireless power transmitter external from an internal surface of the wash tub and configured to generate a wireless power signal;

a wirelessly powered electrical device supported by the rack; and a wireless power receiver supported by the rack and positioned adjacent to the wireless transmitter when the rack is in a washing position to receive the wireless power signal generated by the wireless power signal, the wireless power receiver electrically coupled to power the wirelessly powered electrical device using the received wireless power signal.

2. The dishwasher of claim 1, wherein the wirelessly powered electrical device is an imaging device configured to capture one or more images within the wash tub.

3. The dishwasher of claim 2, wherein the rack is an upper rack and the imaging device is supported by the upper rack.

4. The dishwasher of claim 2, wherein the rack is a lower rack or a third rack and the imaging device is supported by the lower rack or third rack.

5. The dishwasher of claim 2 further comprising a controller coupled to the imaging device and configured to control a wash cycle based on the one or more images captured by the imaging device.

6. The dishwasher of claim 5, wherein the wirelessly powered electrical device is configured to wirelessly communicate data to the controller.

7. The dishwasher of claim 1, wherein the at least one spray device is a spray arm and the wireless powered electrical device is a motor configured to drive the spray arm.

8. The dishwasher of claim 1, wherein the wireless powered electrical device is a sensor configured to detect one or more properties within the wash tub.

9. The dishwasher of claim 1, wherein the wirelessly powered electrical device further includes a battery.

10. A dishwasher, comprising:

a wash tub;

at least one spray device disposed in the wash tub;

a fluid supply configured to supply wash fluid to the at least one spray device during a wash cycle that washes a load, the fluid supply including at least one pump;

a wireless power transmitter external from an internal surface of the wash tub;

a wirelessly powered electrical device disposed within the wash tub; and a fluid conduit configured to support the at least one spray device and the wirelessly powered electrical device, wherein the fluid conduit includes:

a docking port configured to receive fluid from the fluid supply and convey the fluid to the at least one spray device; and a wireless power receiver positioned to receive power from the wireless power transmitter.

11. The dishwasher of claim 10, wherein the wirelessly powered electrical device is an imaging device configured to capture one or more images within the wash tub.

12. The dishwasher of claim 11, further comprising a rack, wherein the fluid conduit comprises a manifold and is supported by the rack, wherein the imaging device is disposed on the manifold.

13. This dishwasher of claim 11 further comprising an occlusion prevention device, wherein the occlusion prevention device interfaces with the at least one spray device and prevents the at least one spray device from occluding the imaging device when the at least one spray device is in a resting position.

14. The dishwasher of claim 11 further comprising a controller coupled to the imaging device and configured to control a wash cycle based on the one or more images captured by the imaging device.

15. The dishwasher of claim 10, wherein wirelessly powered electrical device is configured to wirelessly communicate data to the controller.

16. The dishwasher of claim 10, wherein the wirelessly powered electrical device further includes a battery.

17. A dishwasher of claim 13, wherein the occlusion prevention device is configured to prevent the rotatable spray device from stopping at a location that occludes the imaging device.

18. The dishwasher of claim 17, wherein the rotatable spray device is supported by a support member, and wherein the occlusion prevention device includes a depressible element disposed on one of the rotatable spray device and the support member, the depressible element biased to an extended position and positioned to contact a structure on the other of the rotatable spray device and the support member during rotation of the rotatable spray device.

19. The dishwasher of claim 18, wherein the support member is a fluid conduit and the depressible element is biased to the extended position by a spring and is disposed on the fluid conduit.

20. The dishwasher of claim 17, wherein the rotatable spray device is supported by a support member, and wherein the occlusion prevention device includes:

a first magnet disposed on the rotatable spray device; and a second magnet disposed on the support member proximate a path of the first magnet during rotation of the rotatable spray device and configured to repel the first magnet when the first and second magnets are proximate to one another.

* * * * *